(12) United States Patent
Kurmanov et al.

(10) Patent No.: US 11,948,279 B2
(45) Date of Patent: Apr. 2, 2024

(54) METHOD AND DEVICE FOR JOINT DENOISING AND DEMOSAICING USING NEURAL NETWORK

(71) Applicant: Samsung Electronics Co., Ltd., Suwon-si (KR)

(72) Inventors: Vladimir Gennadievich Kurmanov, Moscow (RU); Iurii Gennadievich Fetisov, Moscow (RU); Xenya Yurievna Petrova, Moscow (RU); Ivan Olegovich Karacharov, Moscow (RU); Kirill Victorovich Lebedev, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 276 days.

(21) Appl. No.: 17/530,013

(22) Filed: Nov. 18, 2021

(65) Prior Publication Data
US 2022/0164926 A1    May 26, 2022

(30) Foreign Application Priority Data
Nov. 23, 2020    (RU) ............................ RU2020138295

(51) Int. Cl.
*G06T 5/00*    (2006.01)
*G06T 3/4015*    (2024.01)
(Continued)

(52) U.S. Cl.
CPC ............ *G06T 5/002* (2013.01); *G06T 3/4015* (2013.01); *G06T 3/4046* (2013.01); *G06T 3/4076* (2013.01); *G06T 2207/20024* (2013.01)

(58) Field of Classification Search
CPC ..... G06T 5/002; G06T 3/4015; G06T 3/4046; G06T 3/4076; G06T 2207/20024;
(Continued)

(56) References Cited

U.S. PATENT DOCUMENTS

| 9,262,810 B1 | 2/2016 | Tuzel et al. |
| 9,344,690 B2 | 5/2016 | Nowozin et al. |

(Continued)

FOREIGN PATENT DOCUMENTS

| CN | 101957309 B | 11/2012 |
| CN | 106709875 A | 5/2017 |

(Continued)

OTHER PUBLICATIONS

Gharbi et al., "Deep Joint Demosaicking and Denoising," 2016.
(Continued)

*Primary Examiner* — Neil R McLean
(74) *Attorney, Agent, or Firm* — Jefferson IP Law, LLP

(57) ABSTRACT

A method of joint denoising and demosaicing using a neural network to generate an output image and to a computing device for implementing the method is provided. The method includes obtaining image data collected by a color filter array (CFA), and jointly performing denoising and demosaicing on the CFA image data using a trained neural network to generate an output image, wherein the neural network has a lightweight U-Net architecture and is trained on a plurality of pairs of training images. One image in each pair of training images is obtained with a lower ISO value than another image in the pair of training images, and is processed by a processing algorithm (image signal processor (ISP)), and the other image in each pair of training images is in a format of CFA image data.

23 Claims, 8 Drawing Sheets

(51) Int. Cl.
*G06T 3/4046* (2024.01)
*G06T 3/4076* (2024.01)

(58) Field of Classification Search
CPC .......... G06T 2207/10024; G06T 2207/20081;
G06T 2207/20084; G06T 2207/20208;
G06N 3/02; G06N 3/04; G06N 20/00
USPC ........................................................ 382/175
See application file for complete search history.

(56) References Cited

U.S. PATENT DOCUMENTS

| | | | |
|---|---|---|---|
| 10,097,765 | B2 | 10/2018 | Sheikh et al. |
| 10,559,073 | B2 | 2/2020 | Nishimura |
| 2015/0215590 | A1* | 7/2015 | Nowozin ............. H04N 23/843 348/242 |
| 2017/0185871 | A1 | 6/2017 | Zhang et al. |
| 2017/0278225 | A1 | 9/2017 | Nishimura |
| 2017/0310901 | A1 | 10/2017 | Sheikh et al. |
| 2018/0158177 | A1 | 6/2018 | Lannes et al. |
| 2019/0108618 | A1* | 4/2019 | Hwang ................. G06T 3/4046 |
| 2019/0365341 | A1 | 12/2019 | Chan et al. |
| 2020/0184598 | A1 | 6/2020 | Jiang et al. |
| 2020/0211229 | A1 | 7/2020 | Hwang et al. |
| 2020/0334789 | A1 | 10/2020 | Zhang et al. |

FOREIGN PATENT DOCUMENTS

| | | | |
|---|---|---|---|
| CN | 107507134 | A | 12/2017 |
| CN | 108257095 | A | 7/2018 |
| CN | 108765258 | A | 11/2018 |
| CN | 108900848 | A | 11/2018 |
| CN | 108921786 | A | 11/2018 |
| CN | 105681628 | B | 12/2018 |
| CN | 108986050 | A | 12/2018 |
| CN | 109064396 | A | 12/2018 |
| CN | 109087269 | A | 12/2018 |
| CN | 109214985 | A | 1/2019 |
| CN | 107301668 | B | 3/2019 |
| CN | 109671023 | A | 4/2019 |
| CN | 109886975 | A | 6/2019 |
| CN | 107302657 | B | 7/2019 |
| CN | 110097515 | A | 8/2019 |
| CN | 110097521 | A | 8/2019 |
| CN | 110191299 | A | 8/2019 |
| CN | 110232653 | A | 9/2019 |
| CN | 110263621 | A | 9/2019 |
| CN | 110443883 | A | 11/2019 |
| CN | 110555805 | A | 12/2019 |
| CN | 110555877 | A | 12/2019 |
| CN | 110557584 | A | 12/2019 |
| CN | 110633705 | A | 12/2019 |
| CN | 110717851 | A | 1/2020 |
| CN | 110728637 | A | 1/2020 |
| CN | 110992432 | A | 4/2020 |
| CN | 111027564 | A | 4/2020 |
| CN | 108492249 | B | 5/2020 |
| CN | 108805814 | B | 5/2020 |
| CN | 111091134 | A | 5/2020 |
| CN | 111161134 | A | 5/2020 |
| CN | 111179216 | A | 5/2020 |
| CN | 111325679 | A | 6/2020 |
| CN | 111328448 | A | 6/2020 |
| CN | 111340696 | A | 6/2020 |
| CN | 111353948 | A | 6/2020 |
| IN | 111064904 | A | 4/2020 |
| KR | 10-2018-0119157 | A | 11/2018 |
| KR | 10-2018-0127633 | A | 11/2018 |
| RU | 2 651 147 | C1 | 4/2018 |
| RU | 2 706 891 | C1 | 11/2019 |
| WO | 2019/104705 | A1 | 6/2019 |
| WO | 2020/041517 | A1 | 2/2020 |
| WO | 2020/126023 | A1 | 6/2020 |

OTHER PUBLICATIONS

Kokkinos et al., "Iterative Joint Image Demosaicking and Denoising using a Residual Denoising Network," 2018.
Ehret et al., "Joint Demosaicking and Denoising by Fine-Tuning of Bursts of Raw Images," ICCV 2019.
Klatzer et al., "Learning Joint Demosaicing and Denoising Based on Sequential Energy Minimization," 2016.
Keras "Convolutional layers" [https://ru-keras.com/convolutional-layers/], Apr. 25, 2020.
Russian Office Search Report dated May 13, 2021, issued in Russian Application No. 2020138295/28.
Russian Office Action dated May 14, 2021, issued in Russian Application No. 2020138295/28.
International Search Report and written opinion dated Dec. 8, 2021, PCT/KR2021/011837.

* cited by examiner

Filter size 4 18 36 72 144 288 288 144 72 36 18 16

METHOD AND DEVICE FOR JOINT DENOISING AND DEMOSAICING USING NEURAL NETWORK

CROSS-REFERENCE TO RELATED APPLICATION(S)

This application is based on and claims priority under 35 U.S.C. § 119(a) of a Russian patent application number 2020138295, filed on Nov. 23, 2020, in the Russian Intellectual Property Office, the disclosure of which is incorporated by reference herein in its entirety.

BACKGROUND

1. Field

The disclosure relates to the field of artificial intelligence (AI). More particularly, the disclosure relates to a method of joint denoising and demosaicing using a neural network to generate an output image and to a computing device for implementing the method.

2. Description of Related Art

Virtually all modern computing devices such as, for example, smartphones and tablets have cameras configured to capture images and video. However, images captured with such cameras are subject to digital noise introduced by photosensors, suboptimal shooting parameters, and difficult shooting conditions (night shooting, shooting with excessive light, etc.). In cameras with a color filter array (CFA, i.e., the most common type of digital cameras) disposed over the photosensor, the noise usually has visually larger grains than pixels in the images. Thus, in the related art, there is a problem of digital noise appearing in images captured by cameras of computing devices. Furthermore, if demosaicing of the noisy RAW image is performed first (i.e., before denoising the image), then such demosaicing correlates with noise, which makes subsequent denoising on the image more complicated. However, if denoising is applied to data that has not yet been subjected to demosaicing, it becomes more difficult to use inter-color correlations that are needed for subsequent denoising on the image. To address these challenges, it is necessary to provide a technical solution that solves the problem of digital noise appearance on images captured by cameras of computing devices, and also performs denoising and demosaicing on images jointly (i.e., in parallel).

To solve these challenges, one may turn to the field of AI and to neural network technologies. Hardware configurations of the most computing devices available currently are capable of performing image and video processing with neural networks, which can be trained in advance using dedicated neural network training equipment (for example, graphics processing unit (GPU), neural processing unit (NPU), field programmable gate array (FPGA), application-specific integrated circuit (ASIC), etc.) and uploaded to the computing device as an end product in the form of, for example, weights, other parameters, and computer-executable instructions for implementing a particular deep neural network architecture. However, since most users' mobile computing devices (smartphone, tablet, etc.) have limited processor computing resources, the neural network architectures used for such devices must be adapted accordingly to enable them to operate in the real time on such computing devices. Therefore, to solve the above-mentioned challenges, an architecture of an applied deep neural network is provided.

In addition, since the neural network training procedure in traditional techniques of joint denoising and demosaicing differs significantly from the image processing algorithm on a computing device on which the trained neural network is subsequently applied according to the related art, a neural network getting high scores during the training procedure does not ensure sufficient quality when integrated into the real image processing pipeline on the device (i.e., at the use/inference stage).

The related art includes a method of replacing certain parts of the processing algorithm with a neural network. The related art describes joint denoising and demosaicing as one useful application. However, the small size of an input image (32×32) leads to a small receptive field of the applied neural network, which, in turn, leads to the appearance of artifacts and overall poor quality of the processed image. Additionally, this related art technique also has a problem of differences between the neural network training procedure and the image processing algorithm applied at the computing device, into which the trained neural network is subsequently integrated. Finally, the versatility of the related art technique leaves much to be desired, since the Image Signal Processor (ISP) pipeline takes into account the full set of operations and for each possible combination it is necessary to train a separate neural network.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of joint denoising and demosaicing using a neural network to generate an output image, the method including obtaining image data collected by color filter array (CFA) image data, and jointly performing denoising and demosaicing on the CFA image data using the trained neural network to generate the output image, wherein the neural network has a lightweight U-Net architecture and is trained on a plurality of pairs of training images, with one image in each pair of training images obtained with a lower light sensitivity International Organization for Standardization (ISO) value than another image in the pair of training images, and processed by a known processing algorithm, the other image in each pair of training images being in a format of CFA image data.

Another aspect of the disclosure is to provide a user computing device including a processor and memory storing the trained neural network and processor-executable instructions, which, when executed, cause the processor to execute the method of joint denoising and demosaicing to generate an output image according to the first aspect of the present disclosure.

Additional aspects will be set forth in part in the description which follows and, in part, will be apparent from the description, or may be learned by practice of the presented embodiments.

The disclosure solves the above-mentioned problems in the prior art and enables joint demosaicing and digital noise suppression on images captured by cameras of computing devices with the neural network having modified architecture. This technical effect is achieved at least because the neural network has the lightweight U-Net architecture and, because it is trained on a plurality of pairs of training images, with one image in each pair of training images obtained with a lower ISO value than another image in the pair of training images, and processed by the known processing algorithm.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
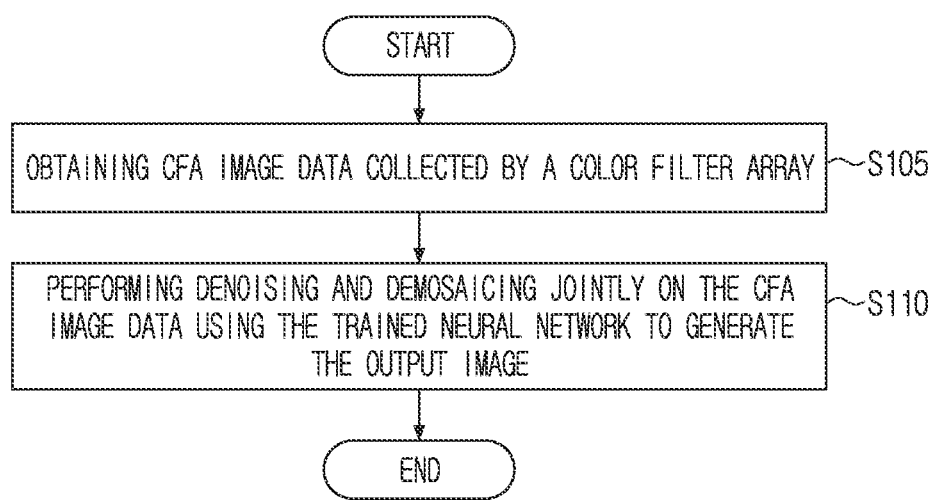
FIG. 1 illustrates a flowchart of a method of joint denoising and demosaicing using a neural network to generate an output image according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "color filter array (CFA)" or "color filter mosaic (CFM)" refers to a component of the camera's photosensitive matrix that performs spatial color separation of an image using photosensors (i.e., pixel sensors of the matrix located behind different color filters). Each pixel sensor of the matrix is covered with a single filter of the array. There are various types of CFA/CFM such as Bayer filter, red, green, blue, exponent (RGBE), cyan, yellow, yellow, magenta (CYYM), cyan, yellow, green, magenta (CYGM), Bayer red, green, blue, white (RGBW), etc., which may be applied without limitation. Since each pixel sensor of the matrix is located behind an elementary color filter, the pixel sensor captures only information about the intensity of its pixel in the partial color-separated image. The Bayer filter is a two-dimensional array of color filters that cover the pixel sensors of the photosensitive matrix. The Bayer filter is used to obtain a color image in the matrices of digital cameras, video cameras, and scanners. The Bayer filter consists of 25% red elements, 25% blue elements, and 50% green elements.

RAW format is a digital image file format containing raw data on electrical signals from the photosensitive matrix of digital cameras, digital video cameras, and still image or film scanners. ISP is an image signal processor that is configured to perform image processing according to a processing algorithm according to the related art. "Debayerization/demosaicing" (CFA/CFM interpolation) is a process used to recover a full color image from incomplete color samples output from the pixel sensors of the photosensitive matrix, which are located behind the CFA/CFM.

FIG. 1 illustrates a flowchart of a method of joint denoising and demosaicing using a deep neural network to generate an output image according to an embodiment of the disclosure.

The method of joint denoising and demosaicing an image using the deep neural network includes obtaining image data collected by a color filter array (i.e., CFA image data) at operation S105. CFA image data is information about the intensity of image pixels in a partial color-separated image. A type of applied CFA determines the content of the CFA image data collected at this step. In one example, when the CFA type is the Bayer filter, the data obtained at this operation comprise a partial R image, a partial G image, and a partial B image. In another example, when the CFA type is RGBE, the data obtained at this operation comprise a partial R image, a partial G image, a partial B image, and a partial E image, and so on. The method further comprises jointly performing denoising and demosaicing on the CFA image data using the trained neural network to generate the output image at operation S110.

The used neural network has a lightweight U-Net architecture and is trained on a plurality of pairs of training images, with one image in each pair of training images obtained with a lower light sensitivity International Organization for Standardization (ISO) value than another image in the pair of training images, and processed by a processing algorithm according to the related art, the other image in each pair of training images is in the format of CFA image data. It should be understood that the images in each pair of images are captured for the same scene, i.e., a scene in one image of a pair is the same as the scene in another image of the pair. A low ISO image is a better quality image, for example, but not limited to, in RGB color space. When collecting training data, preference was given to static scenes that are shot from a tripod. There will be little digital noise in such an image, or the noise level will be below the color quantization threshold, and the overall image contrast will be better than that of a high ISO image. Thus, a low ISO image in each training pair of images can be used in deep neural network training as a reference (ground-truth) image, and the corresponding high ISO image presented in the format of CFA image data collected from pixel sensors of the photosensitive matrix through the color filter array when capturing a color (e.g., RGB) image with a high ISO value, can serve as raw data, which are subjected to joint denoising and demosaicing (i.e., reconstruction) to the reference image.

Figure 2:
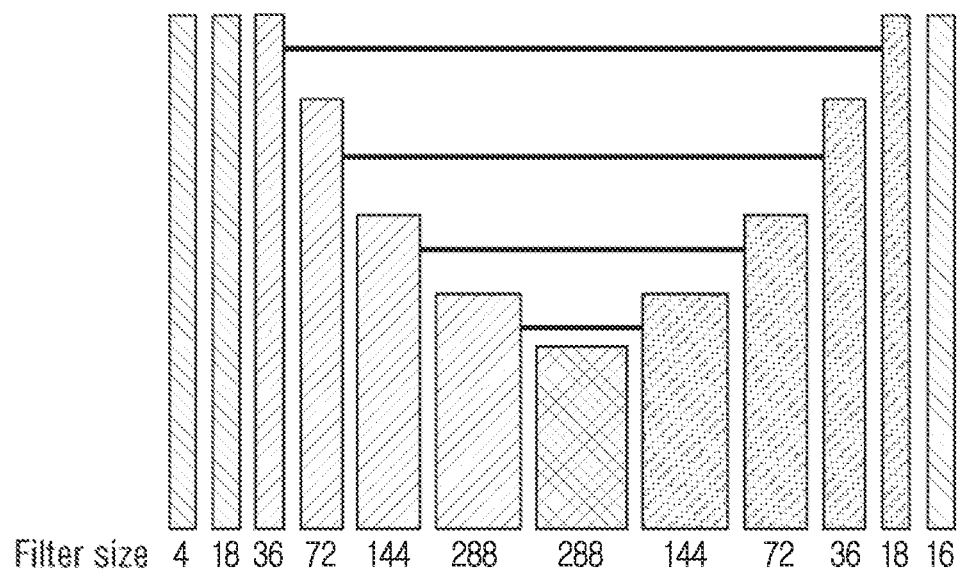
FIG. 2 illustrates one possible implementation of a lightweight U-Net architecture of a neural network that may be applied in a method according to an embodiment of the disclosure.

FIG. 2 illustrates one possible implementation of a lightweight U-Net architecture of a deep neural network that may be applied in a method according to an embodiment of the disclosure.

The deep neural network having the U-Net architecture is a convolutional neural network comprising a contracting path (i.e., an encoder) (corresponding to the left side on the figure) and an expansive path (i.e., a decoder) (corresponding to the right side of the figure), which is why the architecture is similar to a letter 'U' as reflected in the name. Referring to FIG. 2, the U-Net architecture of the neural network comprises skip connections between layers of the encoder and the decoder with a same dimension. The U-Net architecture of the deep neural network for joint denoising and demosaicing is asymmetric (i.e., one or more non-separable convolutions are applied on the encoder side of the network, and one or more separable convolutions are applied on the decoder side) and comprises one or more residual blocks on the encoder side and one or more residual blocks on the decoder side. As shown in FIG. 2, the encoder of the U-Net deep neural network comprises two layers of non-separable 2D convolution (Conv2D) nxn (for example, 3×3, 5×5, and so on) strd=1 (shown with top-to-bottom left-to-right shading), each of which provides a sequence of convolutions and activations, not changing a dimension, four residual blocks with Conv2D (shown with bottom-to-top left-to-right shading), each of which provides summation of a signal at an input of the block and a signal at an output of a group of convolutional layers and activations, wherein the an activation function may be implemented, but without limitation, as a parametric rectified linear unit (PReLU). It should be understood that the disclosure should not be limited to the specific activation function, since other known activation functions, such as Leaky ReLU, PReLU, randomized ReLU (RReLU), etc., may equally well be applied.

Layers of the network having the U-Net architecture, for which the dimension of the image in the feature space is minimal, are referred to as bottleneck layers, the bottleneck layer comprises neither upscaling operations, nor downscaling operations, because in the bottleneck layer, the dimension of the input data is the same as that of the output data. In the illustrated architecture of the deep neural network, the U-Net bottleneck layer is represented by the residual block (shown with the checkered shading) that provides summation of a signal at an input of the block and a signal at an output of a group of convolutional layers and activations in order to solve the vanishing gradient problem in the process of training the network. The decoder of the U-Net deep neural network comprises four separable 2D convolution (SepConv2D) layers (shown with the snake-like shading), each of which is implemented by coupling in series a scaling block using the nearest-neighbor method (nearest upscale) or another known method and a convolution block, wherein the convolution block in at least one layer is the block of separable convolution. Then comes one layer Conv2D nxn (for example, 3×3, 5× 5, etc.) strd=1. The output signal of the bottleneck layer is fed to the input of the first block of the decoder, and a sum of the output signals of the previous layer of the decoder and the skip connection that provides the output signal of the encoder layer having the same dimension is fed to the input of each subsequent block of the decoder, wherein a purpose of the skip connections is to ensure the direct flow of information between far-apart network layers, which contributes to the effective training of deep neural networks and makes it possible to avoid the vanishing gradient problem. Residual block is newly introduced herein for joint denoising and demosaicing. In such an architecture, an input mosaic 1536×1408×1 is transformed into an image 768×704×4 and passed through the UNet-like network with residual blocks. The output tensor has a shape of 768×704×16. The final image is expanded to 1536× 1408×3 from the output tensor. The specified dimensions are to be considered only as examples, and not as a limitation. Particularly, since the network is purely convolutional, the dimension of the input data can be any, but then the input data may be or may not be split into a certain number of tiles for processing to meet memory constraints on a particular device, etc. Training is carried out using L1-norm+Multi-Scale Structural Similarity with 4 scale levels. The dimensions and specific parameter values specified herein should not be interpreted as limiting the disclosure, since other architectures are possible for the claimed purpose (see, for example, the architecture shown in FIG. 3, which is described below).

Filter sizes for each of the layers of the illustrated architecture are shown in FIG. 2. It should be understood that the claimed disclosure should not be limited to the specific filter sizes shown in FIG. 2, since other architectures with different filter sizes could equally well be applied.

Figure 3:
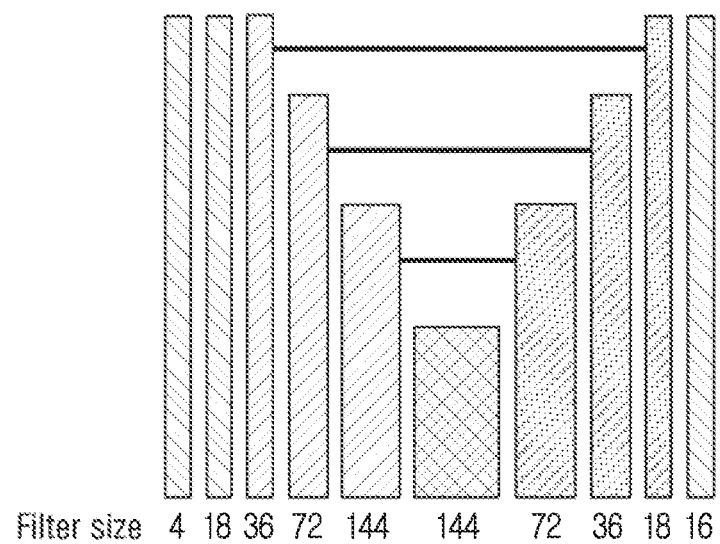
FIG. 3 illustrates another possible implementation of a lightweight U-Net architecture of a neural network that may be applied in a method according to an embodiment of the disclosure.

FIG. 3 illustrates the other possible implementation of a lightweight U-Net architecture of a deep neural network that may be applied in a method according to an embodiment of the disclosure.

The shading of the deep neural network layers and blocks shown in FIG. 3 is fully consistent with the shading used in FIG. 2. The other possible implementation of the U-Net deep neural network architecture shown in FIG. 3 is even lighter (i.e., it contains fewer layers) than the architecture shown in FIG. 2. An asymmetric U-Net neural network in which separable convolution blocks are used only on the decoder side is newly introduced herein.

Figure 4:
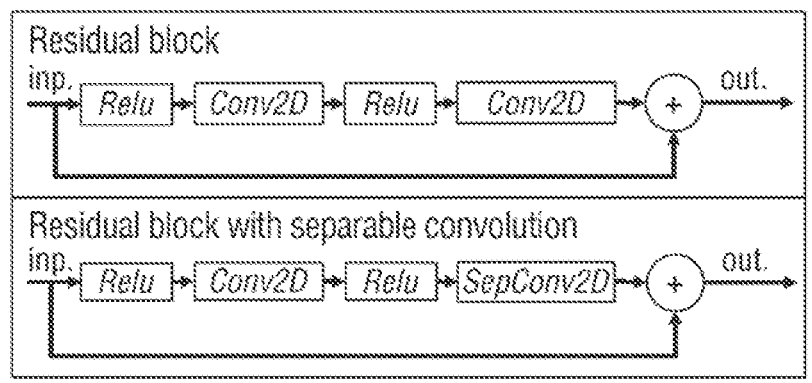
FIG. 4 illustrates a structure of a residual block (Residual block) and a structure of a residual block with separable convolution (ResidualSep block) from a lightweight U-Net architecture of a neural network that may be applied in a method according to an embodiment of the disclosure.

FIG. 4 illustrates a structure of a residual block (Residual block) and a structure of a residual block with separable convolution (ResidualSep block) from a lightweight U-Net architecture of a neural network that may be applied in a method according to an embodiment of the disclosure.

The residual block comprises an input, a first module of ReLU-activation function, a first module of Conv2D, a second module of ReLU-activation function, a second module of Conv2D and an output. The residual block with separable convolution is different from the regular residual block in that the second module of Conv2D is replaced with a module of SepConv2D. This modification is newly introduced herein for joint denoising and demosaicing.

Figure 5:
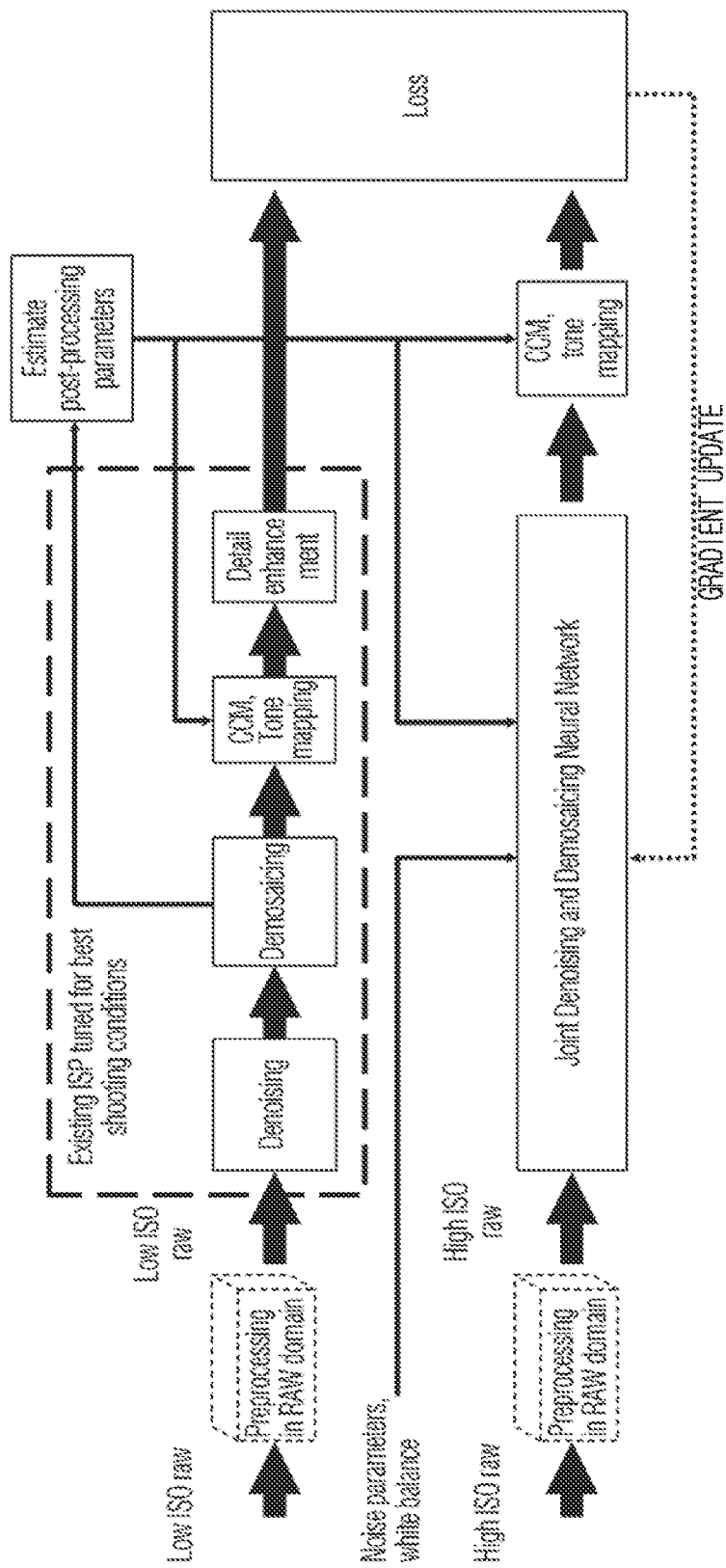
FIG. 5 illustrates a general flowchart of training a neural network that may be applied in a method according to an embodiment of the disclosure.

FIG. 5 illustrates a general flowchart of training a neural network that may be applied in a method according to an embodiment of the disclosure.

Referring to FIG. 5, first training data including pairs of training images is obtained, with one image in each pair of training images obtained at a lower ISO than another image in the pair of training images, the other image is in the format of CFA image data ("mosaics"). It is assumed that when the training images are obtained, the training images are preprocessed in the RAW region, the preprocessing including one or more of white balance transform, multi-frame high dynamic range (HDR) fusion, multi-frame noise suppression, vignetting correction, etc.

A mode of obtaining training data: For the automatic mode, the product exposure_time0*ISO0 was calculated, the minimum ISO=ISO1 was calculated, which would be greater than or equal to the minimum available ISO for a particular smartphone model (usually 40 or 50, the data are available in the Android API), so that exposure_time1 exists such that exposure_time0*ISO0=exposure_time1*ISO1 and exposure_time1 does not exceed the maximum available exposure time for the particular smartphone model (also available in the Android API). As a high ISO value, various values ISO=ISO2 were taken, at least 2 times greater than ISO1, such that exposure_time0*ISO0= exposure_time1*ISO1=exposure_time2*ISO2, and so that the chosen shutter and exposure values fall within the range of possible values for that particular smartphone model. The person skilled in the art will understand other possible options for choosing higher ISO values and lower ISO values. The following table shows the examples of ISO values that can be applied:

TABLE 1

| Number of a pair of training images | Reference (ground truth) image/RGB image with a lower ISO value ISO value | RAW/CFA image data for an image with a higher ISO value ISO value |
|---|---|---|
| 1 | 200 | 300 |
| 2 | 100 | 400 |
| 3 | 100 | 400 |
| 4 | 100 | 200 |
| 5 | 200 | 400 |
| 6 | 200 | 600 |
| 7 | 200 | 800 |
| 8 | 400 | 1600 |
| 9 | 400 | 925 |
| 10 | 200 | 513 |
| 11 | 200 | 721 |
| 12 | ... | ... |

Adding images with different ISO values to the training dataset provides training of a generalizable neural network and ensures that such a network can then be used to process images with different ISO values without changing the network itself and/or re-training.

Next, each training image pair from the training dataset is sequentially processed. A low ISO image is processed using a processing algorithm that performs processing by a real (existing) image signal processor (ISP) configured with optimal shooting parameters according to the related art. Optimal shooting parameters may be determined in accordance with actual use. The processing by the processing algorithm comprises performing separately (i.e., first one and then the other) denoising and demosaicing according to the related art. Optionally, processing the image by the processing algorithm may further comprise one or more of the following post-processing operations selected from a group comprising: applying a color correction matrix, tone mapping, image detail enhancement, identity transform, gamma transform, saturation increase, or a predefined linear or non-linear transformation in one of the following color spaces: red, green, blue (RGB), hue, saturation, value (HSV), LaB, YCbCr, Y in-phase quadrature (YIQ), YUV, hue, saturation, lightness (HSL), but without the limitation according to the related art.

The specific arrangement of operations included in the processing algorithm may differ from ISP to ISP according to the related art. Thus, depending on the specific ISP of a target computing device on which the trained deep neural network is supposed to be used, the processing of the low ISO image by the algorithm can be adapted accordingly at this stage of the deep neural network training. In other words, the processing algorithm at this stage of the deep neural network training can precisely mimic the processing by the ISP on the target computing device according the related art. A second output image is obtained as the result of processing the low ISO image with the processing algorithm (obtaining a first output image will be described later) according to the related art. After processing the low ISO image with the processing algorithm, the parameters of the post-processing performed during the generation of the second output image are evaluated according to the related art. For this, one can refer to values of the parameters with which each post-processing operation was configured at the stage of execution of the processing algorithm, including the demosaicing operation according to the related art.

The resulting demosaicing parameter estimate can be used when applying the color correction matrix and tone mapping at the stage of post-processing operations of the processing algorithm according to the related art. Additionally, the resulting post-processing parameter estimate can be used when applying the color correction matrix and tone mapping to the first output image output from the joint denoising and demosaicing neural network, and can also be taken into account by the neural network as additional training information (these features will be described below).

A high ISO image (corresponding to the low ISO image, the processing of which was described above, that is, the image from the same pair of training images), represented in the format of CFA image data, is fed to the input of the to-be-trained neural network for joint denoising and demosaicing. Additionally, as mentioned above, the parameters of the low ISO image post-processing performed by the processing algorithm can be fed into the neural network. Thus, the neural network can be aware that, for example, shadows will be "stretched" with certain parameters, which causes the network to further suppress noise in these areas. Thereby, the neural network does not need to try to guess these "upcoming" transformations by itself, which is very difficult, especially when processing only a tile of an image. In addition, in different shooting modes, different users may have different preferences that are not known in advance. Nevertheless, due to this feature of training the neural network, it is possible to obtain such an output image that, after the specified post-processing, will look the most advantageously.

Additionally, noise parameters and white balance coefficients with which training images from a corresponding pair of training images are obtained can be fed into the neural network. As an example, white balance coefficients can be quite large, for example 2-3. In other words, noise in one color channel can be higher 2-3 times than noise in other channels. Therefore, such coefficients and parameters can be indicated to the neural network explicitly in order to get a result with improved quality. Thus, post-processing parameters and/or noise parameters and white balance coefficients can be used as additional training information. The to-be-trained neural network for joint denoising and demosaicing generates the first output image, which is the image that passed joint denoising and demosaicing. Color correction matrix and tone mapping, which were applied by the processing algorithm during the generation of the second output image, may be applied to the first output image according to the related art. It should be understood that the use of the terms "first," "second," etc. with respect to any elements and components disclosed in this specification, is intended only to conveniently distinguish between the same type of elements and components, but not to determine any ordinal relationship between such elements and components.

The deep neural network training can be performed using SGD, Adam, or any other known training algorithm. In a preferred embodiment, the neural network has been trained with the Adam training algorithm. At each training iteration: feeding to an input of the deep neural network trained for joint denoising and demosaicing an image with a higher ISO value from a pair of training images to generate a first output image subjected to joint denoising and demosaicing; processing another image with a lower ISO with the processing algorithm including separate denoising and demosaicing to generate a second output image subjected to separate denoising and demosaicing; calculating a loss function for the first output image and the second output image to obtain a gradient of the loss function; and updating parameters of the neural network taking into account the obtained gradient of the loss function in accordance with a training algorithm used according to the related art.

By way of example, and not limitation, in one possible implementation, the loss function can be calculated as follows:

LossFunc(ImgGt,ImgNet)=Lambda1*L1(ImgGt−Img-
Net)+Lambda2*L2(ImgGt−ImgNet)+
Lambda3*SSIM(ImgGt,ImgNet)+
Lambda4*PerceptualLoss(ImgGt,ImgNet)+
Lambda5*HuberNorm(ImgGt−ImgNet), where ImgGt—a second output image/a tile of the image,
ImgNet—a first output image/a tile of the image,
L1, L2—first norm and second norm, respectively,
SSIM (Structural Similarity Index)—a metric for measuring similarity between two images,
HuberNorm—Huber norm,
PerceptualLoss is a distance between images in feature space, and
Lambda1 . . . LambdaN—coefficients selected empirically.

In another embodiment of the training, the deep neural network training is performed iteratively, and at each training iteration: feeding to an input of the deep neural network trained for joint denoising and demosaicing an image with a higher ISO value from a pair of training images to generate a first output image subjected to joint denoising and demosaicing; processing another image with a lower ISO with the processing algorithm including separate denoising and demosaicing to generate a second output image subjected to separate denoising and demosaicing; obtaining one or more modifications of the second output image by applying different additional post-processing operations to different instances of the second output image, a number of resulting modifications of the second output image being equal to a number of additional post-processing operations used, obtaining one or more modifications of the first output image by applying the same additional post-processing operations to different instances of the first output image, calculating a cumulative loss function for the first output image and the second output image as a sum of individual loss functions of each pair of respective modifications of the second output image and the first output image to obtain a gradient of the cumulative loss function; updating parameters of the neural network taking into account the obtained gradient of the cumulative loss function in accordance with a training algorithm used according to the related art. This embodiment of neural network training, which uses various modifications of image post-processing with known parameters, prepares the neural network for possible changes in post-processing parameters when real post-processing values are not available and cannot be estimated for one reason or another.

In the further embodiment, the iteration of the deep neural network training further comprises: evaluating parameters of one or more additional post-processing operations that were performed by the processing algorithm when generating the second output image; and feeding to the input of the neural network the evaluated parameters of the one or more additional post-processing operations for consideration by the neural network trained for joint denoising and demosaicing, when processing the image with the higher ISO value from the pair of training images to generate the first output image subjected to joint denoising and demosaicing according to the related art.

In the further embodiment, the iteration of the deep neural network training further comprises: obtaining one or more of noise model parameters, white balance coefficients and post-processing parameters for at least one of the image with the higher ISO value, feeding to the input of the deep neural network the obtained one or more of noise model parameters, white balance coefficients and post-processing parameters for consideration by the deep neural network trained for joint denoising and demosaicing, when processing the image with the higher ISO value from the pair of training images to generate the first output image subjected to joint denoising and demosaicing.

In another further embodiment, the method further comprises: obtaining one or more of noise model parameters, white balance coefficients and post-processing parameters for the image with the higher ISO value, which is presented in the format of CFA image data, feeding to the input of the neural network the obtained one or more of noise model parameters, white balance coefficients and post-processing parameters for consideration by the trained neural network when jointly performing denoising and demosaicing on the higher ISO image represented by the CFA image data with the trained neural network to generate the output image. The noise model parameters include parameters defining a heteroscedastic noise model with known K and B coefficients, and the post-processing parameters include one or more of color correction matrices and tone mapping curves.

Figure 6:
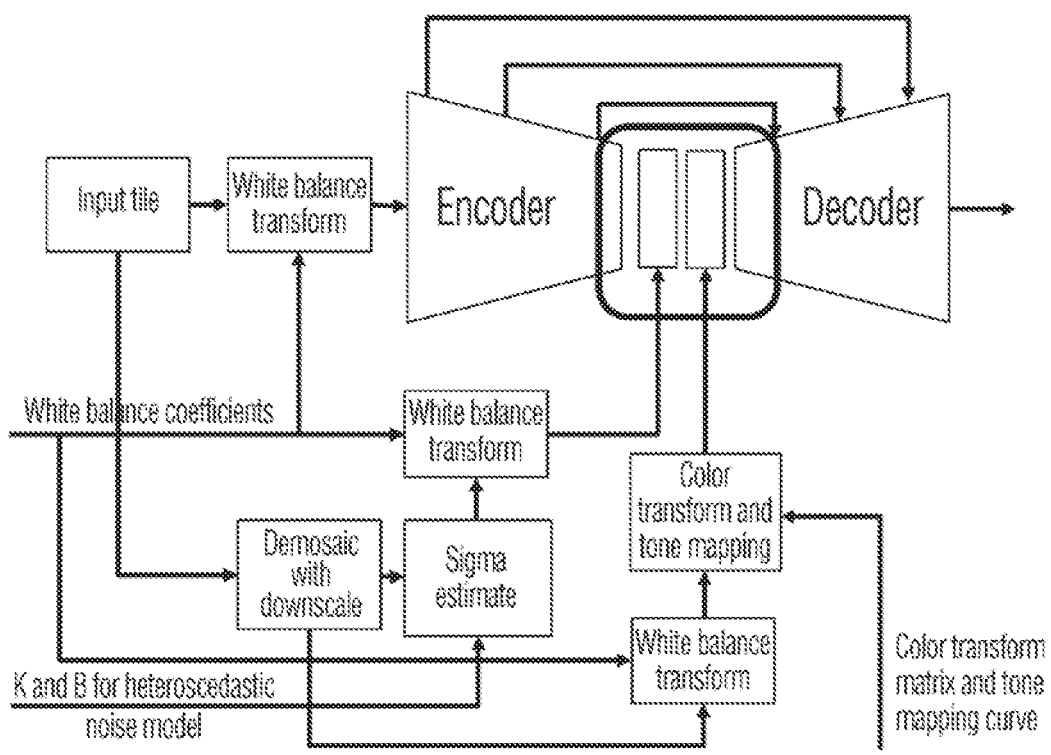
FIG. 6 illustrates a flowchart of concatenating noise model parameters, white balance coefficients and post-processing parameters into a bottleneck layer of a neural network according to an embodiment of the disclosure.

FIG. 6 illustrates a flowchart of concatenating noise model parameters, white balance coefficients and post-processing parameters into a bottleneck layer of a neural network according to an embodiment of the disclosure.

In an embodiment feeding to the input of the neural network the one or more of noise model parameters, white balance coefficients and post-processing parameters is performed by concatenating into a bottleneck layer (shown with the square-like frame in FIG. 6) of the neural network a noise level map calculated for an input image based on the assumption about a heteroscedastic noise model with known K and B coefficients, and white balance coefficients Wr, Wg, Wb for each channel, and a color map obtained for the input image that has been subjected to bilinear demosaicing, downscaling, and processed using the one or more of color correction matrices and tone mapping curves, wherein each channel of the input image being further multiplied by the white balance coefficients. In one embodiment, images at the training stage and at the inference stage are divided into tiles (more detailed description of this embodiment is given below with reference to FIG. 7), the corresponding tiles are processed, and then the tiles are combined into a whole image. Thus, "Input tile" in FIG. 6 refers to such an embodiment of this disclosure. "Noise level map" illustrated in FIG. 6 provides a block-based map of a noise level. At the same time, the noise level map for each color channel can be calculated as Variance=K*I+b, where I is the intensity in a corresponding channel.

In an embodiment of the disclosed method one or more weights applied to the data passing through skip connections comprised in the deep neural network are evaluated based on the noise model parameters and post-processing parameters of the input image using a separate neural subnetwork. Skip connections are a key feature of the U-Net architecture and are used to ensure training of the neural network in the best possible way. Such an evaluation of weights can be useful for the following reasons. With a higher noise level, it is possible to "trust" more to features at a lower resolution, because they already aggregate information from several neighboring pixels, and less to features in a higher resolution. With a low noise level, it is possible to "trust" to the features at a high resolution. A degree of this confidence can be reflected by weights that are used in a weighted sum that can be applied in the present invention instead of the usual addition at the skip connection.

Figure 7:
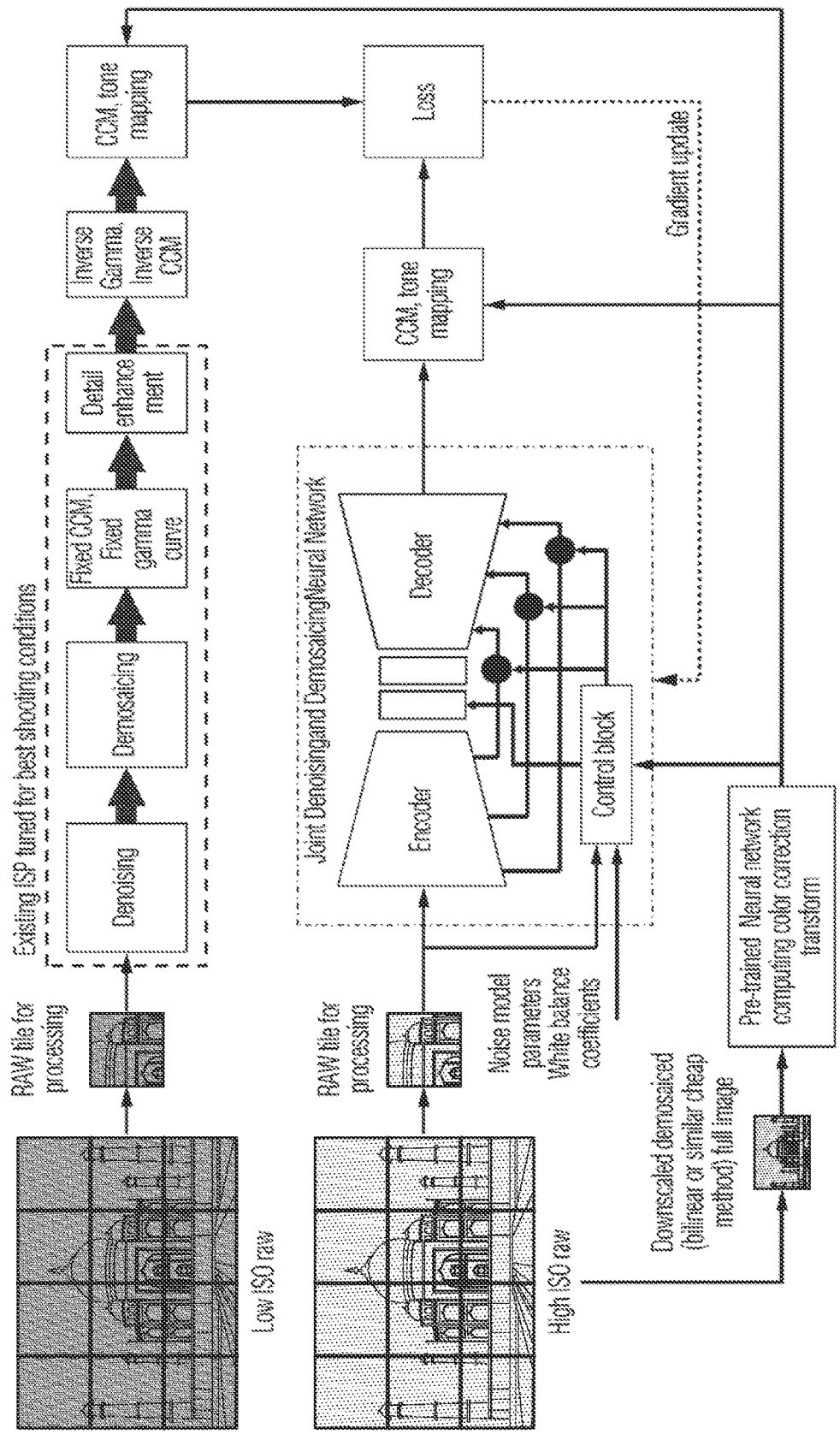
FIG. 7 illustrates possible implementation of training a neural network on image tiles, which may be applied in a method according to an embodiment of the disclosure.

FIG. 7 illustrates possible implementation of training a deep neural network on image tiles, which may be applied in a method according to an embodiment of the disclosure.

In this embodiment, training pairs are pairs of corresponding tiles of both a low ISO image and a high ISO image that is represented in the format of CFA image data.

The method according to this implementation comprises dividing training images into image tiles; processing with the processing algorithm a tile of the low ISO image, processing a tile of the high ISO image with the neural network trained for joint denoising and demosaicing, and calculating a loss function for the processed image tiles according to the related art. Optionally, before calculating the loss function, processed image tiles may be combined into respective processed images on which the loss function is calculated. In other words in this possible implementation the method further comprises at the stage of training the deep neural network: dividing each of the higher ISO image and the lower ISO image from the pair of training images into tiles of a same size and performing the respective neural network training operations based on the corresponding tiles of the higher ISO image and the lower ISO image, which are obtained by dividing.

In this possible implementation of the method the parameters of one or more post-processing operations that are applied to the corresponding tiles of the higher ISO image and the lower ISO image, which are obtained by dividing, are evaluated by an additional pretrained neural network from a whole image that is similar to the higher ISO image, but subjected to downscaling and bilinear demosaicing, wherein the additional neural network is trained on high quality photographs, which are used as reference samples during training.

The post-processing parameters calculated by the auxiliary neural network, along with an input image tile in the Bayer format (CFA image tile data) and white balance coefficients, are fed to an input of a control unit illustrated in FIG. 7. An implementation is possible when the auxiliary network calculates not only the post-processing parameters, but also the white balance coefficients. The control unit is another auxiliary neural network, which, based on input data, calculates a feature vector that is concatenated into the bottleneck layer of the main neural network, as well as weights that are used in the addition of output data of the encoder layers and output data of the corresponding decoder layers at the skip connections.

Noise model parameters K and B for different ISO values can be determined experimentally for several fixed ISO values, and then an interpolator can be implemented that, based on the experimental data, calculates the parameter values for an arbitrary ISO. It is clear to a skilled person that this operation can be implemented using any known interpolation or approximation method, including machine learning methods.

Figure 8:
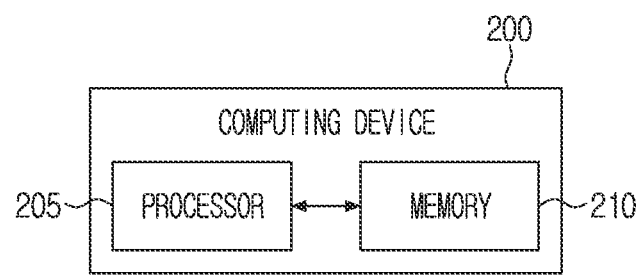
FIG. 8 illustrates a block diagram of a computing device according to an embodiment of the disclosure.

FIG. 8 illustrates a block diagram of a computing device according to an embodiment of the disclosure.

User computing device 200 comprises a processor 205 and memory 210 storing the trained neural network and processor-executable instructions, which, when executed, cause the processor to execute the method of joint denoising and demosaicing to generate an output image according to the first aspect of the disclosure. The processor 205 may perform, among other operations, steps S105 and S110 of the method illustrated in FIG. 1.

According to an embodiment, the processor 205 configured to control the computing device by executing the at least one instruction stored in the memory, and the processor is further configured to obtain CFA image data collected by a color filter array; and perform denoising and demosaicing jointly on the CFA image data using the trained neural network to generate the output image, wherein the neural network comprise a lightweight U-Net architecture and is trained on a plurality of pairs of training images, wherein a first image in respective pair of training images is obtained with a lower ISO value than another image in the respective pair of training images, and the first image is processed by a ISP algorithm, wherein the second image in the respective pair of training images is in the format of CFA image data.

According to an embodiment, wherein the U-Net architecture of the neural network for joint denoising and demosaicing is asymmetric and comprises at least one residual block at an encoder side and at least one residual block at a decoder side, wherein at the encoder side in the neural network is applied at least one non-separable convolution, and at the decoder side in the neural network is applied at least one separable convolution.

According to an embodiment, wherein the at least one residual block at the decoder side is implemented by coupling in series a scaling block using the nearest-neighbor method and a convolution block, wherein in at least one of such convolution blocks a convolution operator is separable.

According to an embodiment, wherein, in the respective pair of training image, a scene in one image among the respective pair of training image is the same as a scene in the other image.

According to an embodiment, wherein ISP algorithm comprises separately performing denoising and demosaicing.

According to an embodiment, wherein the ISP algorithm further comprises at least one of applying a color correction matrix, tone mapping, image detail enhancement, identity transform, gamma transform, saturation increase, and a predefined linear or non-linear transformation in any one of the following color spaces: RGB, HSV, LaB, YCbCr, YIQ, YUV, HSL.

According to an embodiment, wherein the respective of pairs of training images are obtained by performing at least one of white balance transform, multi-frame HDR fusion, multi-frame noise suppression, and vignetting correction.

According to an embodiment, wherein the neural network is trained iteratively, and wherein the processor is further configured to: feed an image with a higher ISO value from a pair of training images to an input of the neural network for joint denoising and demosaicing to generate a first output image in which performed a denoising and demosaicing jointly; process another image with a lower ISO with the ISP algorithm, wherein the ISP algorithm including separately performing denoising and demosaicing to generate a second output image in which performed denoising and demosaicing separately; obtain a loss function for the first output image and the second output image and obtain a gradient based on the loss function; and update parameters of the neural network based on the obtained gradient.

According to an embodiment, wherein the processor is further configured to: evaluate parameters of one or more additional post-processing operations performed by the ISP algorithm based on the second output image being generated; and apply the one or more additional post-processing operations with the same parameters to the first output image.

According to an embodiment, wherein the neural network is trained iteratively, and wherein the processor is further configured to: feed an image with a higher ISO value from a pair of training images to an input of the to-be-trained neural network for joint denoising and demosaicing to generate a first output image in which performed denoising and demosaicing jointly; process another image with a lower ISO with the ISP algorithm, wherein the ISP algorithm including separately performing denoising and demosaicing to generate a second output image in which performed denoising and demosaicing separately; obtain at least one modified second output image by applying different additional post-processing operations to different instances of the second output image, a number of the modified the second output image being equal to a number of additional post-processing operations, obtain at least one modified first output image by applying the same additional post-processing operations to different instances of the first output image, calculate a cumulative loss function for the first output image and the second output image as a sum of individual loss functions of respective pair of respective modifications of the second output image and the first output image to obtain a gradient of the cumulative loss function; update parameters of the neural network based on the obtained gradient.

Memory 210 stores the trained neural network (a set of parameters/weights) and processor-executable instructions, which, when executed, cause the processor to execute the method of joint denoising and demosaicing to generate an output image. Memory 210 is capable of storing any other data and information. The computing device 200 may comprise other, not shown components, for example, a screen, a camera, a communication unit, a touch-sensitive panel, a speaker, a microphone, a Bluetooth module, an NFC module, a Wi-Fi module, a power supply and corresponding interconnections. The disclosed method for joint denoising and demosaicing to generate an output image may be implemented on a wide range of computing devices 200, such as laptops, smartphones, tablets, mobile robots and navigation systems. The implementation of the proposed method supports all kinds of devices capable of performing calculations on the CPU. Additionally, if the computing device has an additional device for accelerating the neural network, such as a GPU (graphics processing unit), NPU (neural processing unit), TPU (tensor data processing unit), faster implementation of the disclosed method is possible on such devices.

At least one of the plurality of modules, blocks, components, steps, sub-steps may be implemented through an AI model. A function associated with AI may be performed through the non-volatile memory, the volatile memory, and the processor. The processor may include one or a plurality of processors. One or a plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning. Here, being provided through learning means that, by applying a learning algorithm to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks. The learning algorithm is a method for training a predetermined target computing device using a plurality of learning data to cause, allow, or control the target computing device to make a determination, estimation, or prediction. Examples of learning algorithms include, but are not limited to, supervised learning, unsupervised learning, semi-supervised learning, or reinforcement learning.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or reordered without departing from the teachings of the present technology. Accordingly, an order and grouping of the steps is not a limitation of the present technology. The use of the singular form in relation to any element disclosed in this application does not preclude that two or more such elements may be in an actual implementation.

Embodiments of the disclosure have been described with reference to the accompanying drawings. However, this disclosure is not intended to limit the embodiments described herein but includes various modifications, equivalents, and/or alternatives. In the context of the description of the drawings, like reference numerals may be used for similar components.

In this document, the expressions "have," "may have," "including," or "may include" may be used to denote the presence of a feature (e.g., a component, such as a numerical value, a function, an operation, a part, or the like), and does not exclude the presence of additional features.

In this document, the expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, (3) at least one A and at least one B all together.

In addition, expressions "first," "second," or the like, used in the disclosure may indicate various components regardless of a sequence and/or importance of the components, will be used only in order to distinguish one component from the other components, and do not limit the corresponding components. For example, a first user device and a second user device may indicate different user devices regardless of a sequence or importance thereof. For example, the first component may be named the second component and the second component may also be similarly named the first component, without departing from the scope of the disclosure.

The term such as "module," "unit," "part," and so on may be used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and be realized in at least one processor. The term user may refer to a person using an electronic device or a device using the electronic device (e.g., an artificial intelligence device).

It is to be understood that an element (e.g., a first element) is "operatively or communicatively coupled with/to" another element (e.g., a second element) is that any such element may be directly connected to the other element or may be connected via another element (e.g., a third element). On the other hand, when an element (e.g., a first element) is "directly connected" or "directly accessed" to another element (e.g., a second element), it can be understood that there is no other element (e.g., a third element) between the other elements.

Herein, the expression "configured to" can be used interchangeably with, for example, "suitable for," "having the capacity to," "designed to," "adapted to," "made to," or "capable of." The expression "configured to" does not necessarily mean "specifically designed to" in a hardware sense. Instead, under some circumstances, "a device configured to" may indicate that such a device can perform an action along with another device or part. For example, the expression "a processor configured to perform A, B, and C" may indicate an exclusive processor (e.g., an embedded processor) to perform the corresponding action, or a generic-purpose processor (e.g., a central processor (CPU) or application processor (AP)) that can perform the corresponding actions by executing one or more software programs stored in the memory device.

Terms used in the disclosure may be used to describe specific embodiments rather than restricting the scope of other embodiments. Singular forms are intended to include plural forms unless the context clearly indicates otherwise. Terms used in the disclosure including technical and scientific terms may have the same meanings as those that are generally understood by those skilled in the art to which the disclosure pertains. Terms defined in a general dictionary among terms used in the disclosure may be interpreted as meanings that are the same as or similar to meanings within a context of the related art, and are not interpreted as ideal or excessively formal meanings unless clearly defined in the disclosure. In some cases, terms may not be interpreted to exclude embodiments of the disclosure even where they may be defined in the disclosure.

The various example embodiments as described above may be implemented with software including instructions stored in the machine-readable storage media readable by a machine (e.g., a computer). A machine is a device which may call instructions from the storage medium and operate according to the called instructions, and may include an electronic device (example: electronic device 100) of the embodiments. When the instructions are executed by a processor, the processor may perform a function corresponding to the instructions directly or by using other components under the control of the processor. The instructions may include a code generated by a compiler or a code executable by an interpreter.

A machine-readable storage medium may be provided in the form of a non-transitory storage medium. Herein, the term "non-transitory" only denotes that a storage medium does not include a signal but is tangible, and does not distinguish the case in which a data is semi-permanently stored in a storage medium from the case in which a data is temporarily stored in a storage medium. For example, "non-transitory storage medium" may refer to a buffer temporarily storing data.

Each of the components (for example, a module or a program) according to the embodiments may be composed of one or a plurality of objects, and some subcomponents of the subcomponents described above may be omitted, or other subcomponents may be further included in the embodiments. Alternatively or additionally, some components (e.g., modules or programs) may be integrated into one entity to perform the same or similar functions performed by each respective component prior to integration. Operations performed by a module, program, or other component, in accordance with the embodiments of the disclosure, may be performed sequentially, in a parallel, repetitive, or heuristic manner, or at least some operations may be performed in a different order, omitted, or other operations can be added.

According to an embodiment, the method according to various embodiments disclosed herein may be provided in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g. PlayStore™) directly between two user devices (e.g., smartphones). In the case of on-line distribution, at least a portion of the computer program product may be stored temporarily or at least temporarily in a storage medium such as a manufacturer's server, a server of an application store, or a memory of a relay server.

While various example embodiments of the disclosure have been illustrated and described herein, it will be understood that the various example embodiments are intended to be illustrative, not limiting. One of ordinary skill in the art will understand that various changes in form and details may be made without departing from the true spirit and full scope of the disclosure as set forth, for example, in the appended claims and their equivalents.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of joint denoising and demosaicing using a neural network to generate an output image, the method comprising:
    obtaining color filter array (CFA) image data collected by a color filter array; and
    performing denoising and demosaicing jointly on the CFA image data using a trained neural network to generate the output image,
    wherein the neural network comprises a lightweight U-Net architecture and is trained on a plurality of pairs of training images,
    wherein a first image in each respective pair of training images is obtained with a lower International Organization for Standardization (ISO) value than another image in the pair of training images and the first image is processed by an image signal processor (ISP) algorithm, and
    wherein a second image in the pair of training images is in a format of CFA image data.

2. The method of claim 1,
    wherein the U-Net architecture of the neural network is asymmetric and comprises at least one residual block at an encoder side thereof and at least one residual block at a decoder side thereof,
    wherein at least one non-separable convolution is applied at the encoder side, and
    wherein at least one separable convolution is applied at the decoder side.

3. The method of claim 2,
    wherein the at least one residual block at the decoder side is implemented by coupling in series a scaling block using a nearest-neighbor method and a convolution block, and
    wherein a convolution operator in at least one convolution block is separable.

4. The method of claim 2, wherein the U-Net architecture of the neural network comprises skip connections between layers of the encoder side and the decoder side with a same dimension.

5. The method of claim 1, wherein, in each respective pair of training images, a scene in one image in the pair of training images is the same as a scene in the other image in the pair of training images.

6. The method of claim 1, wherein the ISP algorithm comprises performing denoising and demosaicing separately.

7. The method of claim 6, wherein the ISP algorithm further comprises at least one of applying a color correction matrix, tone mapping, image detail enhancement, identity transform, gamma transform, saturation increase, or a predefined linear or non-linear transformation in one of the following color spaces: red, green, blue (RGB), hue, saturation, value (HSV), LaB, YCbCr, Y in-phase quadrature (YIQ), YUV, or hue, saturation, lightness (HSL).

8. The method of claim 1, wherein the respective pairs of training images are obtained by performing at least one of white balance transform, multi-frame high dynamic range (HDR) fusion, multi-frame noise suppression, or vignetting correction.

9. The method of claim 1, wherein the neural network is trained iteratively, the training comprising:
    feeding an image with a higher ISO value from a pair of training images to an input of the neural network for joint denoising and demosaicing to generate a first output image in which denoising and demosaicing are performed jointly;
    processing another image with a lower ISO value from the pair of training images with the ISP algorithm, wherein the ISP algorithm includes separately performing denoising and demosaicing to generate a second output image in which denoising and demosaicing are performed separately;
    obtaining a loss function for the first output image and the second output image and obtaining a gradient based on the loss function; and
    updating parameters of the neural network based on the obtained gradient.

10. The method of claim 9, wherein the obtaining of the loss function comprises:
    evaluating parameters of one or more additional post-processing operations performed by the ISP algorithm based on the second output image being generated; and
    applying the one or more additional post-processing operations with same parameters to the first output image.

11. The method of claim 9,
    wherein the loss function is determined according to the following equation:

LossFunc(ImgGt,ImgNet)=Lambda1*$L1$(ImgGt−ImgNet)+Lambda2*$L2$(ImgGt−ImgNet)+Lambda3*SSIM(ImgGt,ImgNet)+Lambda4*PerceptualLoss(ImgGt,ImgNet)+Lambda5*HuberNorm(ImgGt−ImgNet), where ImgGt is a second output image/a tile of the image,
    where ImgNet is a first output image/a tile of the image,
    where L1 and L2 are a first norm and a second norm, respectively,
    where SSIM is a metric for measuring similarity between two images,
    where HuberNorm is a Huber norm,
    where PerceptualLoss is a distance between images in feature space, and
    where Lambda1 . . . LambdaN are coefficients which are selected empirically.

12. The method of claim 1, wherein the neural network is trained iteratively, the training comprising:
    feeding an image with a higher ISO value from a pair of training images to an input of the neural network for joint denoising and demosaicing to generate a first output image in which denoising and demosaicing are performed jointly;

processing another image with a lower ISO value from the pair of training images with the ISP algorithm, wherein the ISP algorithm includes performing denoising and demosaicing separately to generate a second output image in which denoising and demosaicing are performed separately;

obtaining at least one modified second output image by applying different additional post-processing operations to different instances of the second output image, a number of the modified second output image being equal to a number of the additional post-processing operations;

obtaining at least one modified first output image by applying the additional post-processing operations to different instances of the first output image;

calculating a cumulative loss function for the first output image and the second output image as a sum of individual loss functions of respective pairs of respective modifications of the second output image and the first output image to obtain a gradient of the cumulative loss function; and updating parameters of the neural network based on the obtained gradient.

13. The method of claim 1, wherein the CFA image data comprises information about an intensity of image pixels in a partial color-separated image.

14. A computing device comprising:
a memory configured to store at least one instruction; and
a processor configured to control the computing device by executing the at least one instruction stored in the memory,
wherein the processor is further configured to:
obtain color filter array (CFA) image data collected by a color filter array, and
perform denoising and demosaicing jointly on the CFA image data using a trained neural network to generate an output image,
wherein the neural network comprise a lightweight U-Net architecture and is trained on a plurality of pairs of training images,
wherein a first image in respective pair of training images is obtained with a lower International Organization for Standardization (ISO) value than another image in the respective pair of training images, and the first image is processed by an image signal processor (ISP) algorithm, and
wherein a second image in the respective pair of training images is in a format of CFA image data.

15. The computing device of claim 14,
wherein the U-Net architecture of the neural network is asymmetric and comprises at least one residual block at an encoder side thereof and at least one residual block at a decoder side thereof,
wherein at least one non-separable convolution is applied at the encoder side, and
at least one separable convolution is applied at the decoder side.

16. The computing device of claim 15,
wherein the at least one residual block at the decoder side is implemented by coupling in series a scaling block using a nearest-neighbor method and a convolution block, and
wherein in at least one convolution block a convolution operator is separable.

17. The computing device of claim 14, wherein, in each respective pair of training images, a scene in one image among the pair of training images is the same as a scene in the other image among the pair of training images.

18. The computing device of claim 14, wherein the ISP algorithm comprises performing denoising and demosaicing separately.

19. The computing device of claim 18, wherein the ISP algorithm further comprises at least one of applying a color correction matrix, tone mapping, image detail enhancement, identity transform, gamma transform, saturation increase, or a predefined linear or non-linear transformation in one of the following color spaces: red, green, blue (RGB), hue, saturation, value (HSV), LaB, YCbCr, Y in-phase quadrature (YIQ), YUV, or hue, saturation, lightness (HSL).

20. The computing device of claim 14, wherein the respective pairs of training images are obtained by performing at least one of white balance transform, multi-frame high dynamic range (HDR) fusion, multi-frame noise suppression, or vignetting correction.

21. The computing device of claim 14,
wherein the neural network is trained iteratively, and
wherein the processor is further configured to:
feed an image with a higher ISO value from a pair of training images to an input of the neural network for joint denoising and demosaicing to generate a first output image in which performed a denoising and demosaicing jointly,
process another image with a lower ISO value with the ISP algorithm, wherein the ISP algorithm including separately performing denoising and demosaicing to generate a second output image in which performed denoising and demosaicing separately,
obtain a loss function for the first output image and the second output image and obtain a gradient based on the loss function, and
update parameters of the neural network based on the obtained gradient.

22. The computing device of claim 21, wherein the processor is further configured to:
evaluate parameters of one or more additional post-processing operations performed by the ISP algorithm based on the second output image being generated; and
apply the one or more additional post-processing operations with the same parameters to the first output image.

23. The computing device of claim 14,
wherein the neural network is trained iteratively, and
wherein the processor is further configured to:
feed an image with a higher ISO value from a pair of training images to an input of the neural network to generate a first output image in which denoising and demosaicing are performed jointly,
process another image with a lower ISO value from the pair of training images with the ISP algorithm, wherein the ISP algorithm includes performing denoising and demosaicing separately to generate a second output image in which denoising and demosaicing are performed separately,
obtain at least one modified second output image by applying different additional post-processing operations to different instances of the second output image, a number of the modified second output image being equal to a number of the additional post-processing operations,
obtain at least one modified first output image by applying the additional post-processing operations to different instances of the first output image, calculate a cumulative loss function for the first output image and the second output image as a sum of individual loss functions of respective pairs of respective modifications of the second output image and the first output image to obtain a gradient of the cumulative loss function, and update parameters of the neural network based on the obtained gradient.

\* \* \* \* \*